B. W. KADEL.
CAR TRUCK.
APPLICATION FILED FEB. 14, 1922.
1,414,960.
Patented May 2, 1922.
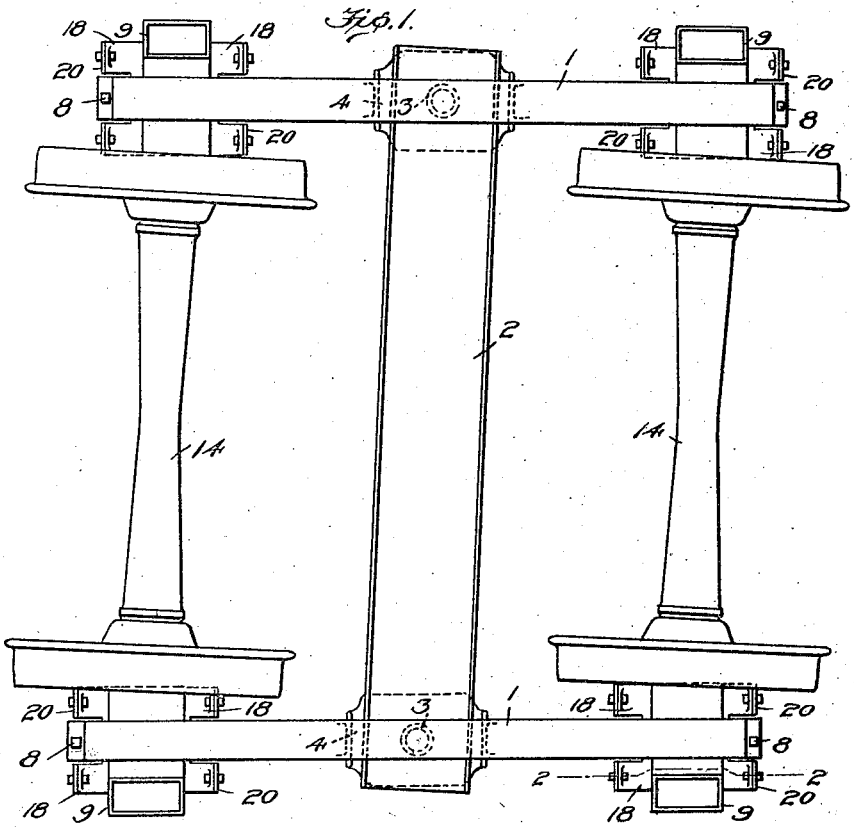
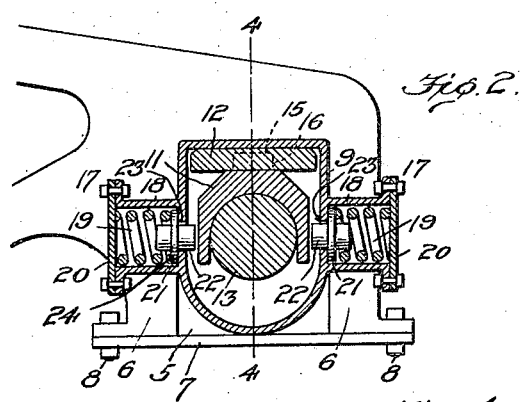
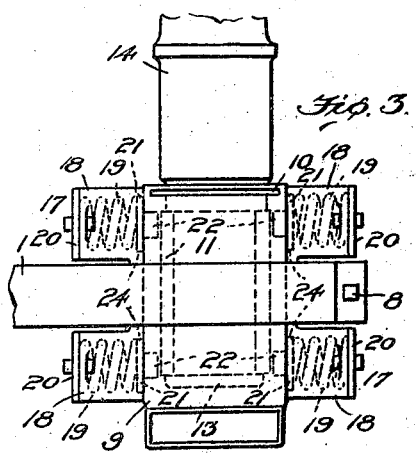
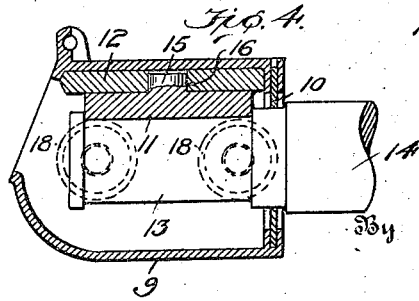
Inventor
Byro W. Kadel
By
Attorney

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,960.  Specification of Letters Patent.  Patented May 2, 1922.

Application filed February 14, 1922. Serial No. 536,454.

*To all whom it may concern:*

Be it known that I, BYERS W. KADEL, a citizen of the United States, residing at Baltimore city, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to car trucks and more particularly to a flexible type of truck wherein the side frame members on opposite sides of the truck are connected in a manner permitting them to execute yieldingly resisted movement longitudinally of the truck, thereby reducing the shocks and strains transmitted to the truck structure incident to its passage around curves, over switch points or because of irregularities in the track or the truck wheels.

Car trucks now in service are of two classes, namely rigid trucks and flexible trucks. Rigid trucks are provided with side frame members which are rigidly connected by a member or members extending between the side frames. In this type of truck, therefore, the side frames are incapable of any appreciable movement relative to each other longitudinally of the truck, without imparting great deforming strains to the truck parts and especially to the connections between the side frames, and as a result much trouble is experienced in keeping the bolts and rivets tight and breakage of the side frames frequently occurs. In other types of rigid trucks wherein the pedestals are connected at their tops to the base of the proper form to be secured to the side sills of the car, similar difficulties have been experienced. I am aware of the use of yieldable devices in this last mentioned type of truck for permitting the wheels to adjust themselves to curves without unnecessary friction, but these devices are incapable of operation when resisting the angular deflection of the side frames and the car axles for purposes of restoring the truck parts to normal square position upon cessation of the impelling forces producing the displacement of said side frames.

The car axles in the foregoing types of rigid trucks are maintained substantially at rigid angles to the side frames and the binding of the truck wheels in the gage of the track or curves is thereby decreased.

In trucks of the flexible type relative longitudinal movement of the side frame members is freely permitted to the full extent of flexibility which the truck is designed to possess. This unrestrained relative movement of the side frames relieves those members and the associated truck parts with which they are connected of the severe shocks to which they would be subjected in service if rigidly united, and thereby reduces breakage of truck parts and lessens the rate of truck deterioration, but these advantages are attained at the expense of high train resistance and severe wheel flange and rail wear incident to binding of the truck wheels upon the rails.

The primary object of my present invention broadly stated, is to provide means for yieldingly resisting the forces which tend to change the normal angular relation between the side frame members and the truck axles, said means being adapted to restore the parts to their normal positions when the distorting or deforming forces producing the displacement of the parts cease to act.

The principal feature of the invention by which this object is accomplished consists in operably associating with the journal box bearing members and side frames, a yieldable means adapted to maintain the parts in normal position until an initial compression of said yieldable means is exceeded, at which time the yieldable means is further energized by the increasing displacement movement, the said energized yieldable means also serving to restore the truck parts to normal position upon cessation of the forces causing the displacement.

A further feature of my invention is to provide a pivotal connection between the journal bearing members and the side frames and arrange a plurality of spring devices about said pivotal connection whereby the angular deflection of the axles and side frames is permitted with comparatively little frictional resistance, the said spring devices being designed to function as a "couple."

A still further feature of the invention consists in the provision of simply constructed and assembled spring devices arranged to extend through the walls of the journal box and adapted to be actuated by the bearing member or brass associated with the spanning axle when the abnormal angular relation of said axle and side frame members occurs.

Other features of the invention residing in the combination and construction of the several parts will hereinafter appear.

In the accompanying drawings illustrating a preferred embodiment of my invention, the scope whereof is pointed out in the claims:

Figure 1 is a top plan view of a car truck embodying the invention, the bolster which is such as is ordinarily employed in flexible trucks, being omitted and the parts being illustrated in the angular relations they assume in passing around a curve.

Figure 2 is a detail vertical longitudinal sectional view on the line 2—2 of Figure 1.

Figure 3 is a detail plan view of the journal box and portion of one side frame showing an end of the axle and bearing brass, together with associated spring devices, in dotted lines.

Figure 4 is a detail vertical transverse sectional view through the journal box and axle on the line 4—4 of Figure 2.

In the form of my invention illustrated in the drawings, the truck includes the side frame members 1—1 connected for movement longitudinally of said truck by means of the transversely extending cross connection or spring plank 2. The spring plank 2 is pivotally connected to the opposite side frame members by means of vertically extending pivot bosses 3 formed on the latter and entering correspondingly shaped apertures or pivot bearings in the spring plank. If desired, the ends of the cross connecting means 2 may project in to the bolster openings 4 in the side frame between the usual columns, sufficient clearance being provided, as in the case of the bolster, to permit the cross connecting member or spring plank 2 to turn through the required angle with respect to the side frames without coming into contact with or binding upon the latter.

The side frame members are provided at their ends with openings 5 formed between the vertical jaw-like portions 6, and a bar 7 bridging the ends of and attached to the jaw portions, as clearly shown in Figure 2. Flanges are provided on the jaws 6 and bolts 8 passing through said flanges serve to secure the bar 7 thereto, against the lower faces of the said jaws. The bar 7 acts to prevent the journal box from sliding out of the opening 5 should the truck for any reason be lifted from off the axles. Rigidly mounted within the openings 5 in the side frame members are the journal boxes 9, each of which is equipped with the dust guard 10, bearing member or brass 11, and wedge or plate 12, which latter serves to distribute the load from the brass 11 to the top of the journal box. The lid (not shown) is of the usual construction.

The ends 13 of the car axles 14 project into the journal boxes, and the bearing member or brass 11 of each journal box is designed to fit the said end portion 13 of the axle, as shown in Figure 2. A cylindrical stud or projection 15 is formed upon the bearing member or brass 11, and extends into an opening 16 provided in the wedge 12, thus making the bearing member 11 rotatable with regard to the wedge and within limits set by the difference in inside width of the journal box and the width of the bearing brass.

The wedge 12 is positioned within the journal box with the usual clearance, and is for all practical purposes relatively fixed or anchored against the top and sides of the journal box against movement in a horizontal plane. Angular deflection of the bearing brass with respect to the wedge is effectively obtained by means of the pivotal connection or cylindrical stud 15, the movement of the axles and relative longitudinal movement of the side frame members out of normal position causing said angular deflection.

The yieldable means for resisting the relative angular displacement of the side frame members and axles from normal position, includes a series of spring devices 17 arranged upon opposite sides of each side frame and adapted to operably engage the ends of the car axles and particularly the bearing member or brass in the journal box. Spring pockets or housings 18 are preferably cast integral with the side walls of the journal box and springs 19 are inserted in said pockets under predetermined initial compression. The spring is retained in each pocket by means of a housing plate forming a closure and abutment wall 20 bolted to the housing 18.

In each spring device a follower or washer 21 is associated with one end of the spring, said follower having an extension 22 adapted to project through an opening 23 in the wall of the journal box and terminate relatively close to the side of the bearing member or brass 11, leaving, however, sufficient clearance to prevent continuous contact under normal running conditions of the truck or when relatively small and inconsequential angular deflections of the side frames and axles occur. Each follower is provided with a flange 24 which bears against one side wall of the journal box and determines the position of the extension 22 of said follower with respect to the bearing member.

When a truck constructed in accordance with my invention is subjected to a force or shock causing the axle to change its angular relation with respect to said side frame members by reason of the latter moving relatively longitudinally of the truck from normal position, the bearing member or brass in each journal box is also angularly deflected, and certain of the yieldable spring devices 17 upon opposite sides of each bearing member are brought into operation for resisting said angular deflection. The shock or displacement movement is cushioned as the result of the resistance offered by oppositely acting springs carried by the journal box, the follower of one of the spring devices upon the outside of the adjacent side frame, and the follower of one of the spring devices upon the inner side of said side frame but upon the opposite side of the bearing member, serving to energize the respective springs as the initial compression is overcome and the angle between the bearing member and side frame is progressively changed from normal position.

The energized springs act in the nature of a couple about the pivotal stud 15, serving to restore the side frames and associated parts to normal position upon cessation of the forces producing displacement movement and the arrangement of the spring devices upon each side of an adjacent side frame member serves to distribute the action of both the displacing and restoring forces so as to provide but little friction and minimum wear upon the bearing brass.

I prefer to arrange the side frame member centrally of the journal box, with the yieldable devices readily accessible upon either side of said journal box, and operable in opposite parallel directions about the centrally located pivot stud 15 when either resisting displacement or restoring the truck parts to normal position.

I claim:—

1. In a car truck, the combination with movable side frame members, of means connecting said side frame members adapted to permit relative longitudinal movement of the side frame members from normal position, car axles spanning said side frame members, journal boxes for said axles, each of said journal boxes including a bearing member engaging the respective ends of said axles, and yieldable means operable against each of said bearing members for resisting relative longitudinal displacement of said side frame members from normal position.

2. In a car truck, the combination with movable side frame members, of means connecting said side frame members adapted to permit relative longitudinal movement of the side frame members from normal position, car axles for said truck, journal bearings for said axles, and means interposed between the car axles and journal boxes, said means being adapted to engage the said bearings for resisting angular deflection of the said axles and said side frame members from normal position.

3. In a car truck, the combination with transversely arranged side frame members, of a spring plank connecting said side frame members, adapted to permit relative longitudinal movement of the side frame members from normal position, car axles movably connected with said side frame members and having journal bearings in said side frame members, and yieldable means adapted to engage the journal bearings, said yieldable means acting to resist angular deflection of the side frame members and axles from normal position.

4. In a car truck, the combination with transversely arranged side frame members, of a spring plank connecting said side frame members adapted to permit relative longitudinal movement of the side frame members from normal position, car axles movably connected with said side frame members and having journal bearings in said side frame members, and yieldable means supported by each of said side frame members and operable against the said journal bearings for resisting angular deflection of the side frame members and axles from normal position.

5. In a car truck, the combination with transversely arranged side frame members, of a spring plank connecting said side frame members adapted to permit relative longitudinal movement of the side frame members from normal position, car axles movably connected with said side frame members and having journal bearings in said side frame members, and means operable against said journal bearings upon displacement of the axles from normal position, said means acting to yieldingly cushion the displacement shock and resist angular deflection of the side frame members and axles from normal position.

6. In a car truck, the combination with movable side frame members, of means connecting said side frame members adapted to permit relative longitudinal movement of the side frame members from normal position, car axles angularly movable out of normal position with relation to said side frame members, journal boxes for the axles, each of said journal boxes being provided with a bearing member, and means engaging said bearing member for resisting angular deflection of the side frame members and axles from normal position.

7. In a car truck, the combination with movable side frame members, of means connecting said side frame members adapted to permit relative longitudinal movement of the side frame members from normal position, car axles angularly movable out of normal position with relation to said side frame members, journal boxes for the axles, each of said journal boxes being provided with a bearing member, and means including yieldable devices adapted to be energized by displacement movement for restoring the side frame members and axles to normal position upon cessation of the forces producing displacement.

8. In a car truck, the combination with movable side frame members, of means connecting said side frame members adapted to permit relative longitudinal movement of the side frame members from normal position, car axles angularly movable out of normal position with relation to said side frame members, journal boxes for the axles, each of said journal boxes being provided with a bearing member, and means including a plurality of springs interposed between said bearing member and the journal box and adapted to be energized by the deflection movement and angular deflection for restoring said truck parts to normal position.

9. In a car truck, the combination with movable side frame members, of means connecting said side frame members and adapted to permit relative longitudinal movement of the said side frame members from normal position, car axles angularly movable out of normal position with relation to said side frame members, journal boxes carried by said side frame members in relative fixed relation thereto and adapted to receive the ends of the axles, and yieldable means extending through the walls of said journal boxes for engagement with the ends of said axles, said means acting to resist angular deflection of the side frame members and axles from normal position.

10. In a car truck, the combination with movable side frame members, of means connecting said side frame members and adapted to permit relative longitudinal movement of the side frame members from normal position, car axles angularly movable out of normal position with relation to said side frame members, journal boxes rigidly attached to said side frame members and adapted to receive the ends of said axles which are angularly movable in said journal boxes, and yieldable means operable against the ends of said axles for resisting angular deflection of the axles with respect to the side frame members.

11. In a car truck, the combination with transversely connected movable side frame members having relative longitudinal movement from normal position, car axles angularly movable out of normal position with relation to said side frame members, journal boxes for said axles, each of said journal boxes having a plurality of openings therein, and yieldable means extending through said openings for engaging the ends of the axles for resisting angular deflection of the side frame members and axles from normal position.

12. In a car truck, the combination with transversely connected movable side frame members having relative longitudinal movement from normal position, car axles angularly movable out of normal position with relation to said side frame members, journal boxes for said axles, and yieldable means extending into said journal boxes for engagement with the ends of the axles, said means serving to resist angular deflection of the side frame members and axles from normal position.

13. In a car truck, the combination with relatively longitudinally movable side frame members, of a spring plank connecting said side frame members adapted to permit angular deflection of the side frame members with relation to the axles of the truck upon displacement from normal position, journal boxes for said axles, and yieldable means extending into said journal boxes for engagement with the ends of the axles, said yieldable means being interposed between the journal boxes and axles and assembled under initial compression for resisting angular deflection of said side frame members and axles from normal position.

14. In a car truck, the combination with relatively longitudinally movable side frame members, of a spring plank connecting said side frame members adapted to permit angular deflection of the side frame members with relation to the axles of the truck upon displacement from normal position, journal boxes for said axles, and yieldable means including a plurality of springs arranged to enter the journal box and yieldingly engage the respective ends of each axle for resisting angular deflection of said side frame members and axles from normal position.

15. In a car truck, the combination with relatively longitudinally movable side frame members, of a spring plank connecting said side frame members adapted to permit angular deflection of the side frame members with relation to the axles of the truck upon displacement from normal position, journal boxes for said axles, and yieldable means for resisting angular deflection between said side frame members and axles, said means including a follower adapted to engage the axles, and a spring interposed between said follower and the journal box.

16. In a car truck, the combination with relatively longitudinally movable side frame members, of a spring plank connecting said side frame members adapted to permit angular deflection of the side frame members with relation to the axles of the truck upon displacement from normal position, journal boxes for said axles, and yieldable means for resisting angular deflection between the side frame members and the axles, said means including a spring pocket formed in said journal boxes, a spring assembled in said pocket under initial compression, and a follower operably associated with said spring and adapted to engage the axles upon angular deflection from normal position.

17. In a car truck, the combination with movable side frame members having an opening in each end thereof, of a spring plank connecting said side frame members adapted to permit relative longitudinal movement of the side frame members from normal position, car axles angularly movable out of normal position with relation to said side frame members, journal boxes rigidly secured within each of said openings and movable with the side frame members, and yieldable means in said journal boxes for engagement with opposite sides of the ends of the axles for resisting angular deflection of said side frame members and axles from normal position.

18. In a car truck, the combination with movable side frame members having an opening in each end thereof, of a spring plank connecting said side frame members adapted to permit relative longitudinal movement of the side frame members from normal position, car axles angularly movable out of normal position with relation to said side frame members, journal boxes rigidly secured within each of said openings and movable with the side frame members, a bearing brass pivotally supported in said journal box, and a plurality of spring devices operable about said bearing brass in the nature of a couple for resisting angular deflection of said side frame members and axles from normal position.

19. In a car truck, the combination with movable side frame members having an opening in each end thereof, of a spring plank connecting said side frame members adapted to permit relative longitudinal movement of the side frame members from normal position, car axles angularly movable out of normal position with relation to said side frame members, journal boxes rigidly secured within each of said openings and movable with the side frame members, a bearing brass pivotally mounted in said journal box, and a plurality of spring devices operable about said bearing brass in opposite parallel directions, said spring devices being normally spaced from said bearing brass to provide an initial clearance between the parts for preventing the operation of said spring devices for relatively small angular deflection of the side frame members and axles.

In testimony whereof I affix my signature.

BYERS W. KADEL.